United States Patent
Kee et al.

(10) Patent No.: US 8,659,503 B2
(45) Date of Patent: Feb. 25, 2014

(54) MULTI-DISPLAY APPARATUS HAVING OVERLAPPING DISPLAY PANELS

(75) Inventors: In-seo Kee, Seongnam-si (KR); Hong-shik Shim, Seoul (KR); Sung-hee Lee, Suwon-si (KR); Young-gu Lee, Suwon-si (KR)

(73) Assignees: Samsung Electronics Co., Ltd. (KR); Samsung Display Co., Ltd. (KR)

( * ) Notice: Subject to any disclaimer, the term of this patent is extended or adjusted under 35 U.S.C. 154(b) by 476 days.

(21) Appl. No.: 12/548,503

(22) Filed: Aug. 27, 2009

(65) Prior Publication Data

US 2010/0201603 A1 Aug. 12, 2010

(30) Foreign Application Priority Data

Feb. 12, 2009 (KR) .................. 10-2009-0011499

(51) Int. Cl.
*G09G 5/00* (2006.01)

(52) U.S. Cl.
USPC .......................................... 345/1.3

(58) Field of Classification Search
USPC .................................. 345/1.1–1.3
See application file for complete search history.

(56) References Cited

U.S. PATENT DOCUMENTS

| | | | |
|---|---|---|---|
| 5,129,875 A | 7/1992 | Chaygneaud-Dupuy | |
| 5,734,513 A | 3/1998 | Wang et al. | |
| 6,377,324 B1 | 4/2002 | Katsura | |
| 2002/0190961 A1* | 12/2002 | Chen | 345/173 |
| 2003/0026068 A1 | 2/2003 | Tsai et al. | |
| 2005/0194896 A1* | 9/2005 | Sugita et al. | 313/506 |
| 2006/0238440 A1* | 10/2006 | Kim et al. | 345/1.1 |
| 2007/0010303 A1 | 1/2007 | Jalonen | |
| 2007/0181456 A1 | 8/2007 | Kusuda et al. | |
| 2008/0079656 A1* | 4/2008 | Kee et al. | 345/1.3 |
| 2008/0100562 A1* | 5/2008 | Huang et al. | 345/102 |
| 2008/0129184 A1* | 6/2008 | Nishida et al. | 313/484 |
| 2008/0218951 A1 | 9/2008 | Kusuda et al. | |

FOREIGN PATENT DOCUMENTS

| | | |
|---|---|---|
| EP | 1876508 A2 | 1/2008 |
| KR | 1020020039891 A | 5/2002 |
| KR | 1020060020317 A | 3/2006 |
| KR | 1020060066461 A | 6/2006 |
| KR | 1020070003295 A | 1/2007 |
| KR | 1020070109116 A | 11/2007 |
| KR | 1020080030261 A | 4/2008 |
| KR | 1020080030262 A | 4/2008 |
| WO | 2007043700 A1 | 4/2007 |

OTHER PUBLICATIONS

European Search Report dated May 7, 2012—Application No. 09178536.0.

\* cited by examiner

*Primary Examiner* — Long D Pham

(74) *Attorney, Agent, or Firm* — Cantor Colburn LLP

(57) ABSTRACT

Provided is a multi-display apparatus formed by connecting a plurality of display panels. The multi-display apparatus includes a first display panel, a second display panel disposed to overlap at least a portion of the first display panel, a transparent plate disposed only on the second display panel, or on both the first display panel and the second display panel, and a transparent window disposed on an area corresponding to the first display panel and the second display panel. The transparent window is foldable when the multi-display apparatus is folded.

20 Claims, 6 Drawing Sheets

MULTI-DISPLAY APPARATUS HAVING OVERLAPPING DISPLAY PANELS

CROSS-REFERENCE TO RELATED APPLICATIONS

This application claims priority to Korean Patent Application No. 10-2009-0011499, filed on Feb. 12, 2009, and all the benefits accruing therefrom under 35 U.S.C. §119, the disclosure of which is incorporated herein in its entirety by reference.

BACKGROUND

1. Field

One or more embodiments relate to a multi-display apparatus which realizes a screen by connecting a plurality of display panels, and more particularly, to a multi-display apparatus including the plurality of display panels connected in a folding method.

2. Description of the Related Art

A multi-display apparatus realizes one large screen by connecting a plurality of display panels. For example, a large screen is realized by connecting a plurality of cathode ray tubes ("CRTs") such as large televisions ("TVs"), for display.

Such a multi-display apparatus is prepared by connecting unit display panels in a line. In other words, a multi-display screen is realized by connecting a plurality of unit display panels abreast of (e.g., directly adjacent to) each other. However, when the unit display panels are connected, an image at a joint between two display panels is not smoothly connected or displayed, and may appear badly broken. Also, a protection member for protecting the display panels, without a screen gap existing between the display panels, is required.

SUMMARY

An exemplary embodiment includes a multi-display apparatus including a protection member for protecting display panels without a screen gap existing between the display panels.

An exemplary embodiment may include a multi-display apparatus including a first display panel, a second display panel disposed to overlap a portion of the first display panel, a transparent plate disposed on the second display panel, or on both the first display panel and the second display panel, and a transparent window disposed on an area corresponding to the first display panel and the second display panel. The transparent window is bent when the multi-display apparatus is folded.

The transparent window may include a first hard (e.g., rigid) unit and a second hard unit, which are spaced apart from each other respectively on the areas corresponding to the first display panel and the second display panel, and a soft unit disposed between the first hard unit and the second hard unit.

The soft unit may surround at least a portion of the first hard unit and at least a portion of the second hard unit.

The soft unit may surround entire surfaces of the first hard unit and the second hard unit, and thus the first hard unit and the second hard unit are contained by the soft unit.

The soft unit may be about 0.002 millimeters (mm) to about 2 millimeters (mm thicker than the first and second hard units.

A refractive index of the transparent window may be in a range of about 1.3 to about 1.7.

The soft unit may be formed of at least one of tefron, a silicon resin, polymethyl methacrylate ("PMMA"), and polydimethylsiloxane ("PDMS").

The first and second hard units may be formed of acryl or polycarbonate.

The multi-display apparatus may further include an optical film disposed on an upper part of the transparent window.

The optical film may be any one of an anti-reflection ("AR") film and an anti-glare ("AG") film.

Each of the first and second display panels may include a substrate, a display device on the substrate, and a protection cover covering the display device.

Refractive indexes of the protection cover, the transparent plate, and the transparent window may be in a range of about 1.3 to about 1.7.

The display device may be any one of a liquid crystal display ("LCD"), a field emission display ("FED"), a plasma display panel ("PDP"), and an organic light-emitting diode ("OLED").

A boundary area of the substrate of the first display panel overlapping with the second display panel may be thinner than other areas of the substrate of the first display panel.

The transparent plate may surround a lower part of the boundary area of the substrate of the first display panel.

The multi-display apparatus may be foldable around the soft unit.

The transparent plate may be disposed on the second display panel to surround a lower surface and one side of the first display panel.

The transparent plate may be disposed on the second display panel to surround a lower surface, an upper surface, and one side between the lower and upper surfaces of the first display panel.

An exemplary embodiment may include a flexible multi-display apparatus including a first display panel including an upper surface, a lower surface and a side surface connecting the upper and lower surfaces, a second display panel overlapping the side surface the first display panel in a plan view of the multi-display apparatus, a unitary indivisible flexible transparent plate disposed overlapping a portion of the second display panel, and disposed directly adjacent to the side surface of the first display panel, and a transparent member disposed directly on an upper surface of the transparent plate and overlapping a portion of both the first display panel and the second display panel. The transparent member bends when the multi-display apparatus is folded to dispose the first display panel facing the second display panel.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
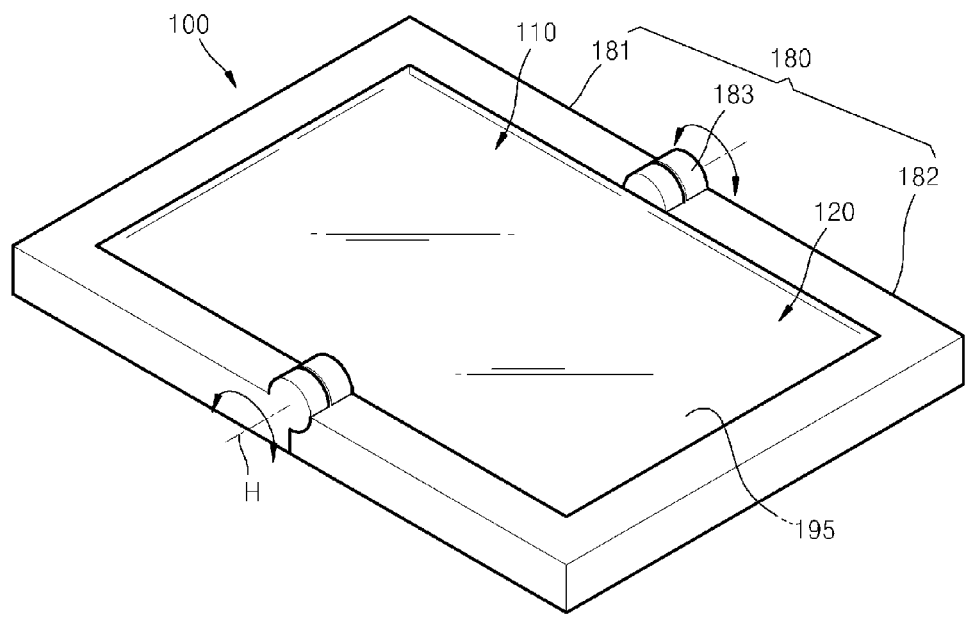
FIG. 1 is a perspective view illustrating a multi-display apparatus according to an embodiment.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to embodiments, examples of which are illustrated in the accompanying drawings. In this regard, the exemplary embodiments may have different forms and should not be construed as being limited to the descriptions set forth herein. Accordingly, the embodiments are merely described below, by referring to the figures, to explain aspects of the detailed description.

Figure 2:
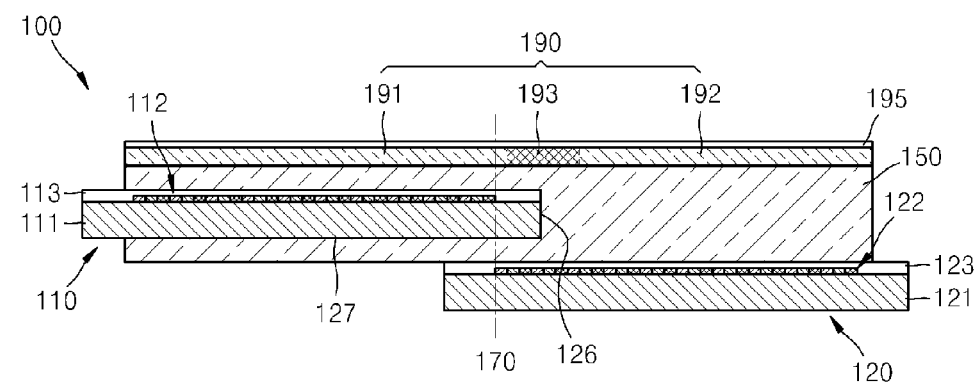
FIG. 2 is a cross-sectional view schematically illustrating the multi-display apparatus of FIG. 1.

FIGS. 1 and 2 are diagrams illustrating a multi-display apparatus 100 according to an embodiment. The multi-display apparatus 100 may be formed by connecting a plurality of display panels by using any of a variety of methods, but for convenience of description, a first display panel 110 and a second display panel 120 are connected in the illustrated embodiment. A first display device 112 and a second display device 122, which realize images, are illustrated in brief.

Two display panels are connected in FIGS. 1 and 2, but the same principle may be applied when a screen is realized by connecting three or more display panels.

The multi-display apparatus 100 includes a body 180 which includes a first part 181, a second part 182, and a hinge unit 183 connecting the first and second parts 181 and 182 to each other. A hinge axis H is formed in a center of the hinge unit 183. In order to realize images, as illustrated in FIG. 2, the first and second display panels 110 and 120 respectively include the first and second display devices 112 and 122 disposed on first and second substrates 111 and 121. The first and second display panels 110 and 120 respectively further include first and second protection covers 113 and 123 for protecting the first and second display devices 112 and 122, such as by covering (e.g., directly overlapping) all outer surfaces of the first and second display devices 112 and 122. The first and second protection covers 113 and 123 may define uppermost elements of the first and second display panels 110 and 120, respectively.

Accordingly, when the multi-display apparatus 100 is an upward light emitting type, images prepared by the first and second display devices 112 and 122 are displayed through the first and second protection covers 113 and 123, and when the multi-display apparatus 100 is a downward light emitting type, the images are displayed through the first and second substrates 111 and 121. The multi-display apparatus 100 illustrated in FIGS. 1 and 2 is an upward light emitting type. The first and second display devices 112 and 122 included in the first and second display panels 110 and 120 may be, for example, a device for a flat panel display, such as a liquid crystal display ("LCD"), a field emission display ("FED"), a plasma display panel ("PDP"), and an organic light-emitting diode ("OLED").

The first and second display panels 110 and 120 may be fixed (e.g., each including a separate screen), or together may effectively form one screen of the multi-display apparatus 100 by being connected to each other in a folding method, whereby the multi-display apparatus 100 is folded and unfolded centering around the hinge axis H, as illustrated in FIG. 1. When the first and second display panels 110 and 120 are connected in the folding method, the first and second display panels 110 and 120 may form a stepped shape in relation to each other, such as where the first and second display panels 110 and 120 partially overlap as illustrated in FIG. 2, when the multi-display apparatus 100 is unfolded. When boundary surfaces (e.g., edges) of the first and second display devices 112 and 122 are aligned along the same perpendicular line 170 by overlapping the first and second display panels 110 and 120, the screen of the multi-display apparatus 100 seems to be continuous when viewed from a perpendicular direction.

However, a perpendicular stepped appearance resulting from the stepped space between the first and second display panels 110 and 120 may be observed. In order to reduce the perpendicular stepped appearance, the multi-display apparatus 100 may include a transparent plate 150 disposed on an upper portion of the second display panel 120. The transparent plate 150 may be extended to cover (e.g., overlap) an upper portion of the first display panel 110. In the illustrated embodiment, the transparent plate 150 may be disposed to overlap a side 126 and a lower surface 127 of the first display panel 110. The transparent plate 150 is a unitary indivisible and continuous member of the multi-display apparatus 100.

In FIG. 2, the transparent plate 150 is disposed to cover an upper surface of the first display panel 110, where the upper surface of the first display panel 110 is separated from an upper surface of the transparent plate 150. Alternatively, the transparent plate 150 may have a same height as the first display panel 110, such that the upper surfaces of the first display panel 110 and the transparent plate 150 are coplanar with each other. The upper surface and a lower surface of the transparent plate 150 are continuous and planar.

In order to protect the first and second display panels 110 and 120, and the transparent plate 150 from an external shock, the multi-display apparatus 100 according to an embodiment may further include a transparent window 190 for shock prevention disposed on the upper parts of the first and second display panels 110 and 120. The transparent window 190 may define an uppermost member of the combined structure including the first and second display panels 110 and 120, and the transparent plate 150, but the invention is not limited thereto.

The transparent window 190 includes hard (e.g. rigid) units 191 and 192, which protect the first and second display panels 110 and 120 and the transparent plate 150 from an external shock, and a transparent soft (e.g., flexible or deformable) unit 193 disposed between the hard units 191 and 192 in an area corresponding to the hinge axis H, so as to allow the multi-display apparatus 100 to fold such that the first and second display panels 110 and 120 face each other. An upper surface and a lower surface of the transparent window 190 are continuous and planar. As used herein, "corresponding" may refer to as being related in position, dimension and/or shape to another element.

The transparent plate 150 may include a soft material which is flexible and can be elastically restored after it is deformed, so that the multi-display apparatus 100 is foldable to dispose the first and second display panels 110 and 120 facing each other.

The soft unit 193 may include a polymer material which is flexible and can be elastically restored after it is deformed. For example, the soft unit 193 may include any one of polymethyl methacrylate ("PMMA"), polydimethylsiloxane ("PDMS"), a transparent silicon resin, and tefron.

The hard units 191 and 192 are transparent plates, and may include a rigid, or essentially non-flexible, transparent plastic, such as acryl or polycarbonate.

A thickness of the transparent plate 150 may change according to a thickness of the first display panel 110. The thickness of the transparent plate 150 is taken in a direction of the perpendicular line 170 shown in FIG. 2. The thickness of the first display panel 110 may be in a range of about 0.01 millimeters (mm) to about 3 mm, and the transparent plate 150 may be about 0.002 mm to about 2 mm thicker than the first display panel 110. In detail, a portion of the transparent plate 150 which surrounds the first display panel 110, for example, a portion adjacent to the side 126, may have a thickness in a range of about 0.001 mm to about 1 mm further than the upper or lower surface 127 of the first display panel 110. A portion of the transparent plate 150 which extends over and overlaps an upper surface of the second display panel 120 may have a thickness in a range of about 0.012 mm to about 5 mm.

Refractive indexes of the first protection cover 113 of the first display panel 110 and the transparent plate 150 may be substantially the same, so that light is not refracted on an interface between the first protection cover 113 and the transparent plate 150. Alternatively, the refractive indexes of the first protection cover 113 and the transparent plate 150 may not be the same, but may be similar so that the light is barely refracted. In an exemplary embodiment, the refractive index of the transparent plate 150 may be in a range of about 1.3 to about 1.7.

In order to improve the performance of the multi-display apparatus 100 according to the usage of the multi-display apparatus 100, an optical film 195 may be attached to the upper portion of the transparent plate 150, such as being disposed directly on and contacting an upper surface of the transparent window 190. In one exemplary embodiment, a polarizing film, an anti-reflection ("AR") film, or an anti-glare ("AG") film may be disposed on an entire of the upper surface of the transparent plate 150. The optical film 195 may define an uppermost member of the combined structure including the first and second display panels 110 and 120, the transparent plate 150 and the transparent window 190 as illustrated in FIG. 2.

A thickness of the transparent window 190 may be in a range of about 0.002 mm to about 2 mm. The thickness is taken in a direction of the perpendicular line 170, shown in FIG. 2.

Figure 3:
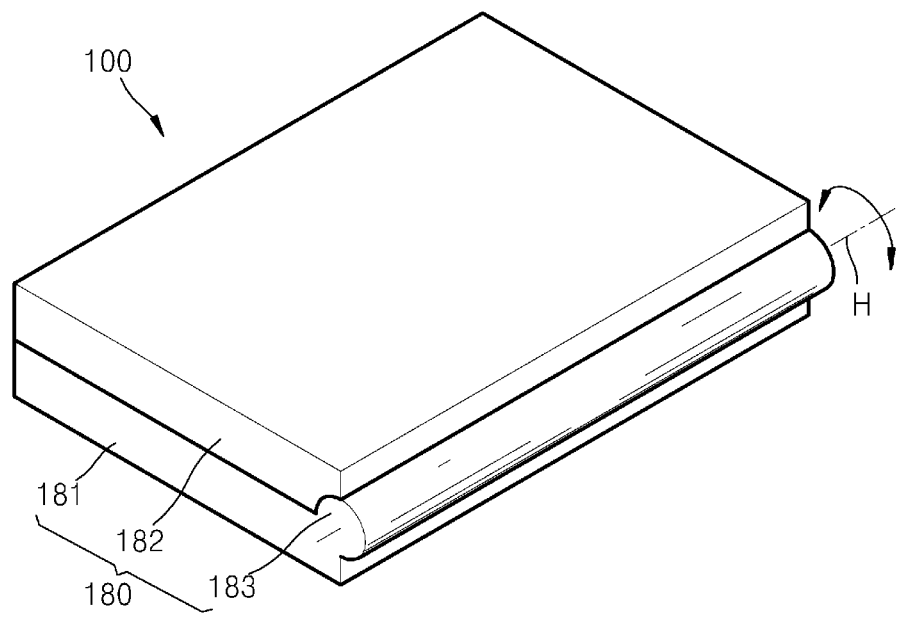
FIGS. 3 and 4 are respectively a perspective view and a cross-sectional view exemplarily illustrating a folded state of the multi-display apparatus of FIGS. 1 and 2.
Figure 4:
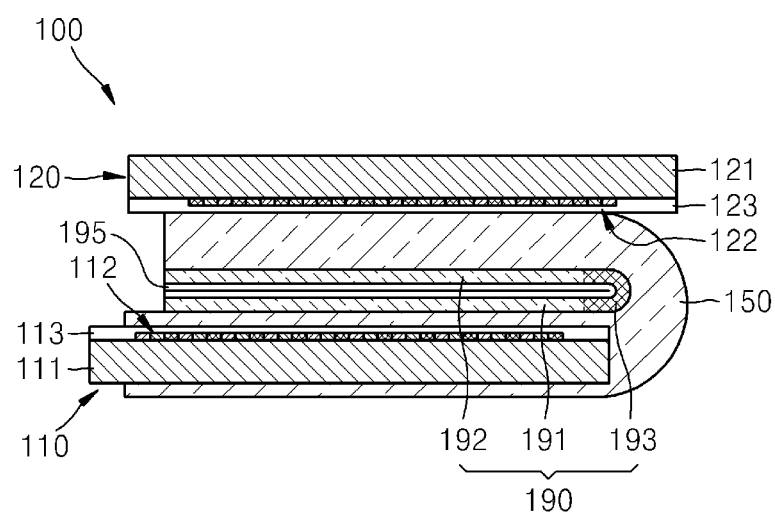

FIGS. 3 and 4 are respectively a perspective view and a cross-sectional view exemplarily illustrating a folded state of the multi-display apparatus 100 of FIGS. 1 and 2. In FIG. 3, an internal folded state of the first and second display panels 110 and 120, and the transparent window 190 are not shown. The body 180 including the first part 181, the second part 182, and the hinge unit 183 effectively forms an outermost member of the multi-display apparatus 100. The combined structure of the first and second display panels 110 and 120 are disposed in the body 180, as illustrated in FIGS. 1 and 3.

Referring to FIG. 4, since the transparent window 190 includes the soft unit 193 in an area corresponding to the hinge axis H, and the transparent plate 150 includes a flexible material, the multi-display apparatus 100 is easily folded to disposed the first and second display panels 110 and 120 to face each other. In FIG. 4, the transparent window 190 and the transparent plate 150 are illustrated as being relatively very thick, but since the transparent window 190 and the transparent plate 150 are thin, the multi-display apparatus 100 can be folded.

In an exemplary embodiment in order to adjust the refractive index of the soft unit 193, a suitable additive may be further added to a material of the soft unit 193.

Figure 5:
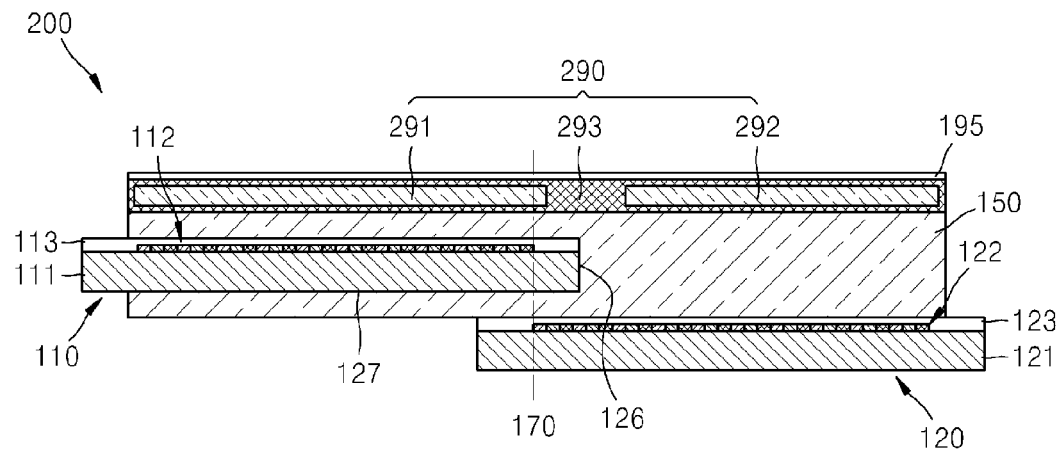
FIG. 5 is a cross-sectional view illustrating a multi-display apparatus according to another embodiment.

FIG. 5 is a cross-sectional view illustrating a multi-display apparatus 200 according to another embodiment. The same reference numerals are used for elements which are identical to the elements shown in FIGS. 1 through 4, and detailed descriptions thereof are omitted.

Referring to FIG. 5, a transparent window 290 includes hard (e.g., rigid) units 291 and 292 respectively disposed on upper portions of the first and second display panels 110 and 120, and a soft (e.g., flexible or deformable) unit 293 surrounding an entire of all outer surfaces of both the hard units 291 and 292. Since the hard units 291 and 292 are essentially sealed inside the soft unit 293, an air gap does not exist in a boundary between the hard units 291 and 292 and the soft unit 293. Accordingly, a screen gap between the first and second display panels 110 and 120 is not generated since light is not diffused or refracted in the boundary between the hard units 291 and 292 and the soft unit 293.

Thicknesses of the hard units 291 and 292 may be in a range of about 0.002 mm to about 2 mm, and a thickness of the soft unit 293 may be about 0.002 mm to about 2 mm thicker than the hard units 291 and 292. The thicknesses are taken in a direction of the perpendicular line 170.

Figure 6:
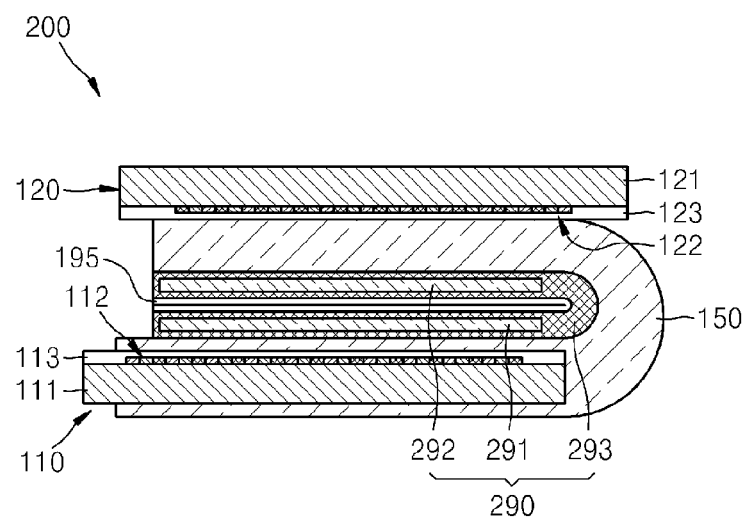
FIG. 6 is a cross-sectional view illustrating a folded state of the multi-display apparatus of FIG. 5.

Since the multi-display apparatus 200 is substantially identical to the multi-display apparatus 100 except for a structure of the transparent window 290, detailed descriptions thereof are omitted herein. FIG. 6 is a cross-sectional view illustrating a folded state of the multi-display apparatus 200 of FIG. 5. Since the soft unit 293 is disposed between the hard units 291 and 292, and in an area where the transparent plate 150 and the transparent window 290 are bent, the multi-display apparatus 200 is easily folded to dispose the first and second display panels 110 and 120 to face each other.

Figure 7:
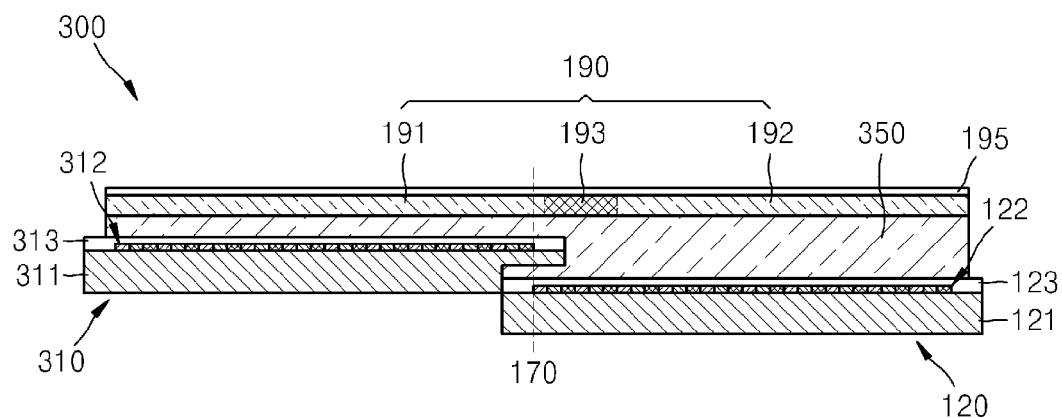
FIG. 7 is a cross-sectional view illustrating a multi-display apparatus according to another embodiment.

FIG. 7 is a cross-sectional view illustrating a multi-display apparatus 300 according to another embodiment. The same reference numerals are used for elements which are identical to the elements shown in FIGS. 1 through 4, and detailed descriptions thereof are omitted.

Referring to FIG. 7, a portion of a first substrate 311 of a first display panel 310, which overlaps with the second display panel 120 is thinner than other areas of the first substrate 311. In other words, the first substrate 311 includes two portions each having different thicknesses. As illustrated in FIG. 7, a thickness of a portion of the first substrate 311 disposed above and overlapping a portion of the second display panel 120 is thinner than remaining portions of the first substrate 311. The portions of the first substrate 311 having the different thicknesses form a step portion at an area where the first substrate 311 overlaps the second display panel 120.

A transparent plate 350 is disposed directly adjacent to and surrounding a thin area of the first display panel 310, including a portion of a lower surface of the first display panel 310, and a side of the first display panel 310. As shown in FIG. 7, the transparent plate 350 may extend to cover most of an upper surface of the first display panel 310, such as overlapping a whole of the first display devices 312. In a plan view, outer edges of the transparent plate 350 are spaced apart from the outer edges of the first and second display panels 310 and 120, respectively. The transparent plate 350 is not disposed adjacent to or overlapping with a lowermost surface of the first display panel 310 at thicker portions of the first substrate 311. In contrast, the transparent plate 150 in FIGS. 5 and 6 is disposed directly adjacent to and overlapping with a lowermost surface of the first display panel 110, which is effectively the lower surface of the first substrate 111.

The transparent plate 350 is disposed directly adjacent to an upper surface of a first protection cover 313 of the first display panel 310 so as to completely overlap a first display device 312, which is a light emitting area of the first display panel 310.

Since the first substrate 311 of the first display panel 310 is thin in a boundary area between the first and second display panels 310 and 120, a stepped space formed by light emitting areas of the first and second display panels 310 and 120 may be decreased. Accordingly, a perpendicular stepped appearance resulting from the stepped space between the first and second display panels 310 and 120 may be reduced.

Figure 8:
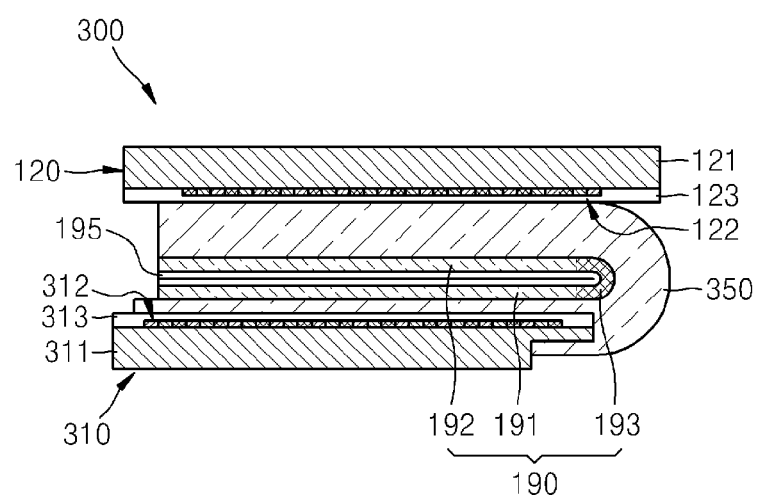
FIG. 8 is a cross-sectional view exemplarily illustrating a folded state of the multi-display apparatus of FIG. 7.

FIG. 8 is a cross-sectional view exemplarily illustrating a folded state of the multi-display apparatus 300 of FIG. 7. Since the transparent plate 350 and the soft unit 193 of the transparent window 190 include a flexible material, the multi-display apparatus 300 is foldable to dispose the first and second display panels 310 and 120 facing each other. Also, since the transparent plate 350 of FIG. 7 may be thinner than the transparent plate 150 of FIG. 2, the multi-display apparatus 300 of FIG. 7 may be more easily folded.

Figure 9:
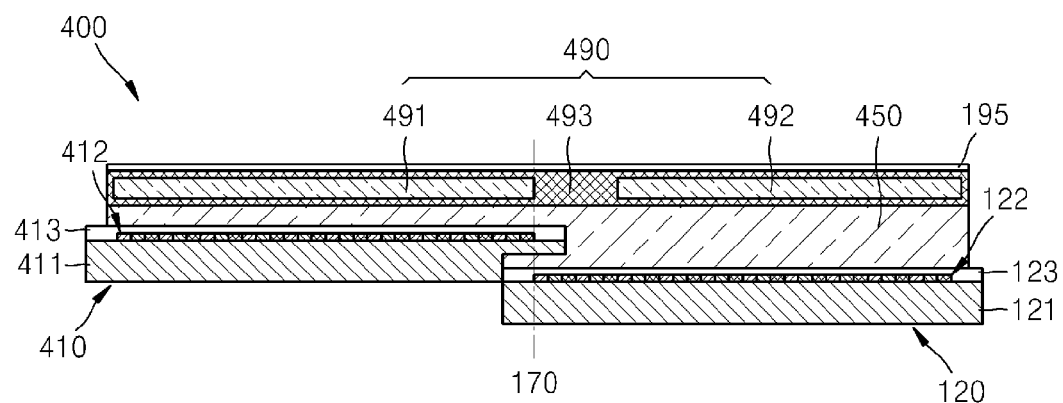
FIG. 9 is a cross-sectional view illustrating a multi-display apparatus according to another embodiment.
Figure 10:
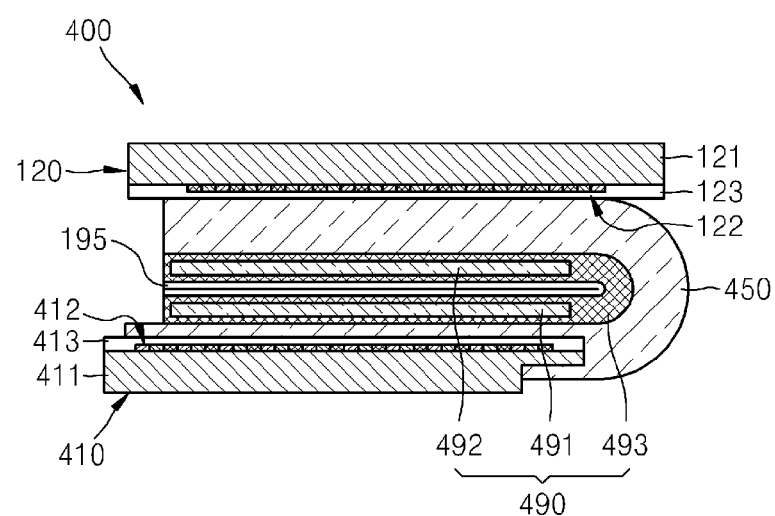
FIG. 10 is a cross-sectional view exemplarily illustrating a folded state of the multi-display apparatus of FIG. 9.

FIG. 9 is a cross-sectional view illustrating a multi-display apparatus 400 according to another embodiment, and FIG. 10 is a cross-sectional view exemplarily illustrating a folded state of the multi-display apparatus 400 of FIG. 9. The same reference numerals are used for elements which are identical to the elements shown in FIGS. 1 through 6, and detailed descriptions thereof are omitted.

Referring to FIGS. 9 and 10, a portion of a first substrate 411 of a first display panel 410, which overlaps with the second display panel 120, is thinner than other areas of the first substrate 411. In other words, the first substrate 411 includes two portions each having different thicknesses. A thickness of a boundary portion of the first substrate 411 disposed overlapping with a portion of the second display panel 120 is thinner than in remaining areas of the first substrate 411.

A transparent plate 450 is disposed directly adjacent to and surrounds a thin area of the first display panel 410, including a portion of a lower surface and a side of the first display panel 410. As shown in FIG. 9, the transparent plate 450 may extend to surround (e.g., overlap) most of an upper surface of the first display panel 410.

The transparent plate 450 is disposed directly adjacent to an upper surface of a first protection cover 413 of the first display panel 410 so as to completely overlap a first display device 412, which is a light emitting area of the first display panel 410.

Since the first substrate 411 of the first display panel 410 is thin in the boundary area between the first display panel 410 and the second display panel 120, a stepped space formed by light emitting areas of the first and second display panels 410 and 120 is reduced. Accordingly, a perpendicular stepped appearance resulting from the stepped space between the first and second display panels 410 and 120 may be reduced.

A transparent window 490 includes hard (e.g., rigid) units 491 and 492, which are respectively disposed on the first and second display panels 410 and 120, and a soft (e.g., flexible or deformable) unit 493, which surrounds an entire of all outer surfaces of the hard units 491 and 492. Since the hard units 491 and 492 are essentially sealed inside the soft unit 493, an air gap does not exist in a boundary between the hard units 491 and 492 and the soft unit 493. Accordingly, a screen gap between the first and second display panels 410 and 120 is not generated since light is not diffused or refracted in the boundary between the hard units 491 and 492 and the soft unit 493.

Thicknesses of the hard units 491 and 492 of the transparent window 490 may be in a range of about 0.002 mm to about 2 mm, and a thickness of the soft unit 493 may be about 0.002 mm to about 2 mm thicker than the hard units 491 and 492. The thicknesses are taken in a direction of the perpendicular line 170.

Figure 11:
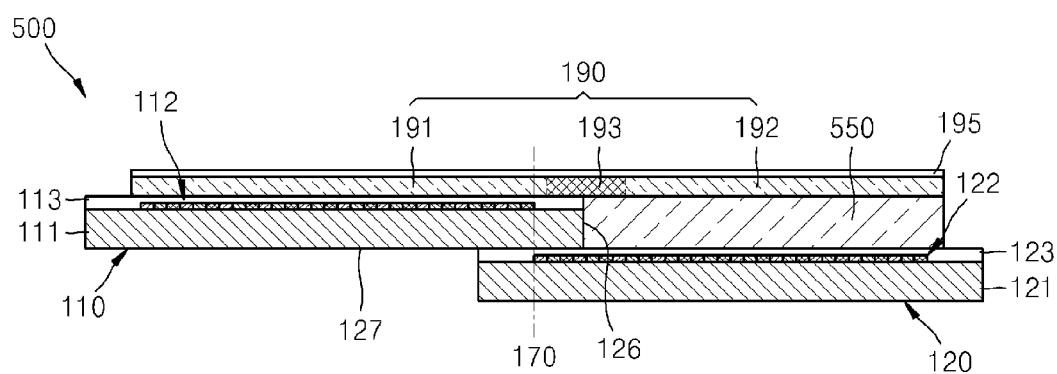
FIG. 11 is a cross-sectional view illustrating a multi-display apparatus according to another embodiment.

FIG. 11 is a cross-sectional view illustrating a multi-display apparatus 500 according to another embodiment. The same reference numerals are used for elements which are identical to the elements shown in FIGS. 1 through 4, and detailed descriptions thereof are omitted.

Referring to FIG. 11, the first substrate 111 of the first display panel 110 is disposed to overlap with the second display panel 120. A transparent plate 550 is disposed on the second display panel 120 to have the same height as an upper surface of the first display panel 110, and directly contacts one side of the first display panel 110. Unlike the embodiments in FIGS. 5-10, no portion of the transparent plate 550 overlaps the first display panel 110 in a plan view. The transparent plate in FIG. 11 is disposed overlapping only the second display panel 120 in the plan view.

Where an upper surface of the transparent plate 550 is disposed substantially coplanar with the upper surface of the first display panel 110, the upper surfaces form a continuous and planar surface. A thickness of the first display panel 110 and the transparent plate 550 may be substantially the same, since both the first display panel and the transparent plate 550 are disposed on a same upper surface of the second display panel 120, while forming the continuous and planar upper surface. The transparent plate 550 is a unitary indivisible and continuous member of the multi-display apparatus 500.

Since the first and second display panels 110 and 120 are not separated by the transparent plate 550 and are disposed close together at a boundary area between the first and second display panels 110 and 120, a stepped space formed by light emitting areas of the first and second display panels 110 and 120 is reduced compared to the multi-display apparatus 100 of FIG. 2. Accordingly, a perpendicular stepped appearance resulting from the stepped space between the first and second display panels 110 and 120 may be reduced.

The transparent window 190 includes the hard units 191 and 192, which protect the first and second display panels 110 and 120 and the transparent plate 150 from an external shock, and the soft unit 193, which is disposed between the hard units 191 and 192 on an area corresponding to the hinge axis H (refer to FIG. 1) in the plan view, so as to allow the first and second display panels 110 and 120 to fold.

Since the structure and the operations of the multi-display apparatus 500 may correspond to the structure and the operations of the multi-display apparatus 100 of FIGS. 1 through 4, detailed descriptions thereof are omitted herein.

As described above, according to the one or more of the above embodiments, a single, unitary and indivisible screen of a multi-display apparatus stretching over a plurality of display panels is smoothly connected by reducing a perpendicular stepped appearance between the display panels, and the display panels are protected without hindering folding of the multi-display apparatus, by including a transparent window for shock prevention.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A multi-display apparatus comprising:
a first display panel;
a second display panel which overlaps a portion of the first display panel in a plan view of the multi-display apparatus in an un-folded state thereof;
a unitary indivisible transparent plate which overlaps a portion of both the first display panel and the second display panel, and is between the overlapping portions of the first and second display panels, in the un-folded state of the multi-display apparatus; and
a transparent window disposed overlapping both the first display panel and the second display panel,
wherein the unitary indivisible transparent plate is further between the second display panel and the transparent window,
the transparent window is in a bent state when the multi-display apparatus is in a folded state such that the first display panel faces the second display panel, and
wherein the transparent window comprises:
a first rigid unit and a second rigid unit, which are spaced apart from each other in the plan view of the multi-display apparatus in the un-folded state thereof, the first rigid unit and the second rigid unit being respectively disposed on areas corresponding to the first display panel and the second display panel, and
a soft unit disposed between the first rigid unit and the second rigid unit in the plan view of the multi-display apparatus in the un-folded state thereof.

2. The multi-display apparatus of claim 1, wherein the soft unit surrounds at least a portion of the first rigid unit and at least a portion of the second rigid unit.

3. The multi-display apparatus of claim 1, wherein the soft unit is disposed adjacent to an entire of all outer surfaces of the first rigid unit and the second rigid unit, such that the first rigid unit and the second rigid unit are surrounded by the soft unit.

4. The multi-display apparatus of claim 3, wherein a thickness of the soft unit is about 0.002 millimeters to about 2 millimeters larger than thicknesses of both the first and second rigid units, the thicknesses taken substantially perpendicular to an upper surface of the transparent window.

5. The multi-display apparatus of claim 1, wherein a refractive index of the transparent window is in a range of about 1.3 to about 1.7.

6. The multi-display apparatus of claim 1, wherein the soft unit includes at least one of tefron, a silicon resin, polymethyl methacrylate (PMMA), and polydimethylsiloxane (PDMS).

7. The multi-display apparatus of claim 1, wherein the first and second rigid units include acryl or polycarbonate.

8. The multi-display apparatus of claim 1, further comprising an optical film disposed directly on an upper surface of the transparent window.

9. The multi-display apparatus of claim 8, wherein the optical film is any one of an anti-reflection film and an anti-glare film.

10. The multi-display apparatus of claim 1, wherein each of the first and second display panels comprises a substrate, a display device on the substrate, and a protection cover disposed overlapping an entire of the display device.

11. The multi-display apparatus of claim 10, wherein refractive indexes of the protection cover, the unitary indivisible transparent plate, and the transparent window are in a range of about 1.3 to about 1.7.

12. The multi-display apparatus of claim 10, wherein the display device is any one of a liquid crystal display, a field emission display, a plasma display panel, and an organic light-emitting diode.

13. The multi-display apparatus of claim 10, wherein a thickness of a portion of the substrate of the first display panel overlapping with the second display panel in the plan view, is smaller than a thickness of remaining portions of the substrate of the first display panel not overlapping with the second display panel.

14. The multi-display apparatus of claim 13, wherein a portion of the transparent plate is disposed between the thinner portion of the substrate of the first display panel overlapping with the second display panel, and the second display panel.

15. The multi-display apparatus of claim 13, wherein the soft unit is disposed directly adjacent to an entire of all outer surfaces of both the first and second rigid units, such that the first and second rigid units are surrounded by the soft unit.

16. The multi-display apparatus of claim 13, further comprising an optical film disposed directly on an upper surface of the transparent window.

17. The multi-display apparatus of claim 1, wherein the multi-display apparatus is foldable around the soft unit to dispose the first display panel facing the second display panel.

18. The multi-display apparatus of claim 1, wherein a lower surface of the first display panel overlaps and faces an upper surface of the second display panel, in the un-folded state of the multi-display apparatus, and a side of the first display panel connects the lower surface to an upper surface of the first display panel, and the unitary indivisible transparent plate faces the side of the first display panel.

19. The multi-display apparatus of claim 18, wherein the unitary indivisible transparent plate is further between the upper surface of the first display panel and the transparent window, in the un-folded state of the multi-display apparatus.

20. The multi-display apparatus of claim 1, wherein a position of the transparent window with respect to the unitary indivisible transparent plate in an un-folded state of the multi-display apparatus is maintained in the folded stated of the multi-display apparatus.

* * * * *